(12) United States Patent
Kimura et al.

(10) Patent No.: US 11,525,512 B2
(45) Date of Patent: Dec. 13, 2022

(54) SEAL RING

(71) Applicant: EAGLE INDUSTRY CO., LTD., Tokyo (JP)

(72) Inventors: Wataru Kimura, Tokyo (JP); Yuichiro Tokunaga, Tokyo (JP); Yoshiaki Takigahira, Tokyo (JP); Toru Kono, Tokyo (JP); Hidetoshi Kasahara, Tokyo (JP); Jun Hiromatsu, Tokyo (JP); Takafumi Ota, Tokyo (JP)

(73) Assignee: EAGLE INDUSTRY CO., LTD.

( * ) Notice: Subject to any disclaimer, the term of this patent is extended or adjusted under 35 U.S.C. 154(b) by 7 days.

(21) Appl. No.: 17/047,631

(22) PCT Filed: May 16, 2019

(86) PCT No.: PCT/JP2019/019500
§ 371 (c)(1),
(2) Date: Oct. 14, 2020

(87) PCT Pub. No.: WO2019/221228
PCT Pub. Date: Nov. 21, 2019

(65) Prior Publication Data
US 2021/0116030 A1    Apr. 22, 2021

(30) Foreign Application Priority Data
May 17, 2018  (JP) .............................. JP2018-095698

(51) Int. Cl.
*F16J 15/18* (2006.01)
*F16J 15/16* (2006.01)
*F16J 15/34* (2006.01)

(52) U.S. Cl.
CPC ........... *F16J 15/182* (2013.01); *F16J 15/162* (2013.01); *F16J 15/3412* (2013.01)

(58) Field of Classification Search
CPC .... F16J 15/00; F16J 15/16; F16J 15/50; F16J 15/52; F16J 15/162; F16J 15/324;
(Continued)

(56) References Cited

U.S. PATENT DOCUMENTS 5,092,612 A    3/1992  Victor et al. ............. F16J 15/34
5,174,584 A   12/1992  Lahrman .................. F16J 15/16
(Continued)

FOREIGN PATENT DOCUMENTS

CN    201448439    5/2010  ............. F16J 15/16
CN    102619742    8/2012  ............. F04B 53/00
(Continued)

OTHER PUBLICATIONS

European Search Report issued in related Application Serial No. 19803635, dated Jan. 25, 2022, 7 pgs.
(Continued)

*Primary Examiner* — Nathan Cumar
(74) *Attorney, Agent, or Firm* — Hayes Soloway P.C.

(57) ABSTRACT

Provided is a seal ring configured so that stable lubrication performance can be provided across a wide range of rotation speed. A seal ring for sealing a clearance between a rotary shaft and a housing includes; inclined grooves formed at a sliding surface so as to be arranged in a circumferential direction, the inclined grooves being closed on an outer diameter side thereof and configured to generate a dynamic pressure; and supply grooves opening on a sealed fluid side and communicating with an inner diameter side of the inclined grooves.

13 Claims, 10 Drawing Sheets

(58) Field of Classification Search
CPC .. F16J 15/3404; F16J 15/3408; F16J 15/3412; F16J 15/3424; F16J 15/40; F16J 15/182; F16J 15/183

USPC .......................................................... 277/411

See application file for complete search history.

(56) References Cited

U.S. PATENT DOCUMENTS

| | | | |
|---|---|---|---|
| 5,447,316 A | 9/1995 | Matsui | F16J 15/3412 |
| 5,498,007 A | 3/1996 | Kulkarni | F16J 15/3412 |
| 5,529,317 A | 6/1996 | Muller | F16J 15/34 |
| 5,702,110 A | 12/1997 | Sedy | 277/96.1 |
| 6,189,896 B1 | 2/2001 | Dickey et al. | 277/608 |
| 9,228,660 B2 * | 1/2016 | Hosoe | F16J 15/3412 |
| 9,695,940 B2 | 7/2017 | Haynes | F16J 15/442 |
| 9,777,840 B2 | 10/2017 | Tokunaga | F16J 15/34 |
| 9,850,953 B2 | 12/2017 | Tokunaga | F16C 32/06 |
| 10,190,689 B2 | 1/2019 | Yoshida et al. | F16J 15/34 |
| 10,267,421 B2 | 4/2019 | Ohya | F16J 15/162 |
| 10,408,349 B2 | 9/2019 | Miyazaki et al. | F16J 15/12 |
| 10,428,948 B2 | 10/2019 | Hosonuma et al. | F16J 15/16 |
| 10,519,966 B2 | 12/2019 | Yamamoto et al. | F04D 29/046 |
| 10,704,417 B2 | 7/2020 | Tokunaga et al. | F01D 25/16 |
| 10,941,863 B2 | 3/2021 | Negishi | F16J 15/3416 |
| 11,143,232 B2 | 10/2021 | Negishi et al. | F16J 15/34 |
| 2005/0212217 A1 | 9/2005 | Tejima | F16J 15/3412 |
| 2005/0263963 A1 | 12/2005 | Lai | F16J 15/3408 |
| 2007/0296156 A1 | 12/2007 | Yanagisawa et al. | F16J 15/34 |
| 2012/0018957 A1 | 1/2012 | Watanabe | F16J 15/441 |
| 2013/0209011 A1 | 8/2013 | Tokunaga | F16C 33/74 |
| 2015/0123350 A1 * | 5/2015 | Itadani | F16J 15/3412 277/400 |
| 2016/0003361 A1 | 1/2016 | Takahashi et al. | F16J 15/36 |
| 2016/0238134 A1 | 8/2016 | Ohya et al. | F16J 15/162 |
| 2017/0009889 A1 | 1/2017 | Seki et al. | F16J 15/441 |
| 2018/0045314 A1 | 2/2018 | Hosonuma et al. | F16J 15/164 |
| 2018/0051809 A1 | 2/2018 | Yoshida | F16J 15/3244 |
| 2018/0058584 A1 * | 3/2018 | Miyazaki | F16J 15/441 |
| 2018/0073394 A1 | 3/2018 | Tokunaga | F02C 7/06 |
| 2018/0100584 A1 | 4/2018 | Park | F16J 15/3272 |
| 2018/0292010 A1 | 10/2018 | Ohya et al. | F16J 15/342 |
| 2020/0182356 A1 | 6/2020 | Itadani | F16J 15/3284 |
| 2020/0217419 A1 | 7/2020 | Seki | F16J 15/441 |
| 2020/0300370 A1 | 9/2020 | Yoshida | F16J 15/411 |

FOREIGN PATENT DOCUMENTS

| | | | |
|---|---|---|---|
| CN | 103097782 | 5/2013 | F16J 15/34 |
| CN | 107110202 | 8/2017 | F16C 17/10 |
| CN | 107407417 | 11/2017 | F16J 15/18 |
| CN | 107407424 | 11/2017 | F16J 15/34 |
| CN | 107429844 | 12/2017 | F16J 15/18 |
| CN | 107532726 | 1/2018 | F16J 15/34 |
| CN | 109923340 | 6/2019 | F16J 15/34 |
| DE | 112013004454 | 5/2015 | F16J 15/18 |
| EP | 3273115 | 3/2016 | F16J 15/18 |
| EP | 3273117 | 3/2016 | F16J 15/18 |
| EP | 3543569 | 11/2017 | F16J 15/24 |
| EP | 3299685 | 3/2018 | F16J 15/34 |
| JP | 62-39308 | 8/1987 | F16J 15/34 |
| JP | 3-41268 | 4/1991 | F16J 15/34 |
| JP | 3-88062 | 9/1991 | F16J 15/18 |
| JP | H0388062 | 9/1991 | F16J 15/18 |
| JP | 4-272581 | 9/1992 | F16J 15/34 |
| JP | 5-61566 | 8/1993 | F16J 15/26 |
| JP | 8-28709 | 2/1996 | F16J 15/18 |
| JP | 9-210211 | 8/1997 | F16J 15/18 |
| JP | 10-281299 | 10/1998 | F16J 15/34 |
| JP | 2000-310336 | 11/2000 | F16J 15/16 |
| JP | 2008-275052 | 11/2008 | F16J 15/18 |
| JP | 2009-250378 | 10/2009 | F16J 15/34 |
| JP | 2012-2295 | 1/2012 | F16J 15/34 |
| WO | WO 2014/041832 | 3/2014 | F16J 15/18 |
| WO | WO 2014/142265 | 9/2014 | F16J 15/34 |
| WO | WO 2015/045974 | 4/2015 | F16J 15/46 |
| WO | WO 2015/111707 | 7/2015 | F16J 15/18 |
| WO | WO 2016/148043 | 9/2016 | F16J 15/18 |
| WO | WO-2016148048 A1 * | 9/2016 | F16J 15/164 |
| WO | WO 2017/065069 | 4/2017 | F16J 15/18 |
| WO | WO2018092742 | 5/2018 | F16J 15/34 |

OTHER PUBLICATIONS

European Search Report issued in related Application Serial No. 19803232, dated Jan. 26, 2022, 6 pgs.

European Search Report issued in related Application Serial No. 19804382, dated Jan. 26, 2022, 7 pgs.

Notice of Allowance issued in related U.S. Appl. No. 17/046,261, dated Jan. 11, 2022, 10 pgs.

International Preliminary Report on Patentability issued in PCT/JP2019/019498, dated Nov. 17, 2020, with English translation, 6 pages.

International Search Report and Written Opinion issued in PCT/JP2019/019498, dated Jul. 2, 2019, with English translation, 12 pages.

International Preliminary Report on Patentability issued in PCT/JP2019/019499, dated Nov. 17, 2020, with English translation, 8 pages.

International Search Report and Written Opinion issued in PCT/JP2019/019499, dated Jul. 9, 2019, with English translation, 15 pages.

International Preliminary Report on Patentability issued in PCT/JP2019/019500, dated Nov. 17, 2020, with English translation, 12 pages.

International Search Report and Written Opinion issued in PCT/JP2019/019500, dated Jul. 2, 2019, with English translation, 20 pages.

International Preliminary Report on Patentability issued in PCT/JP2019/019501, dated Nov. 17, 2020, with English translation, 6 pages.

International Search Report and Written Opinion issued in PCT/JP2019/019501, dated Aug. 6, 2019, with English translation, 10 pages.

International Preliminary Report on Patentability issued in PCT/JP2019/019505, dated Nov. 17, 2020, with English translation, 6 pages.

International Search Report and Written Opinion issued in PCT/JP2019/019505, dated Jul. 2, 2019, with English translation, 12 pages.

European Search Report issued in related Application Serial No. 19803913.3, dated Jan. 28, 2022, 7 pgs.

European Search Report issued in related Application Serial No. 19804266.5, dated Jan. 31, 2022, 8 pgs.

Chinese Official Action issued in related Application Serial No. 201980027672.2, dated Mar. 3, 2022, 7 pgs.

Chinese Official Action issued in related Application Serial No. 201980027774.4, dated Mar. 1, 2022, 8 pgs.

Official Action issued in related U.S. Appl. No. 17/048,085, dated Mar. 30, 2022, 9 pgs.

Official Action issued in related U.S. Appl. No. 17/047,645, dated Mar. 10, 2022, 10 pgs.

Official Action issued in related U.S. Appl. No. 17/047,631, dated Apr. 4, 2022, 26 pgs.

Chinese Official Action issued in related Application Serial No. 201980027746.2, dated Apr. 6, 2022, 10 pgs.

Chinese Official Action issued in related Application Serial No. 201980027673.7, dated Mar. 23, 2022, 10 pgs.

U.S. Appl. No. 17/146,261, filed Oct. 8, 2020, Kimura et al.
U.S. Appl. No. 17/047,645, filed Oct. 14, 2020, Kimura et al.
U.S. Appl. No. 17/046,261, filed Oct. 8, 2020, Kimura et al.
U.S. Appl. No. 17/047,369, filed Oct. 13, 2020, Kimura et al.

* cited by examiner

Fig.4
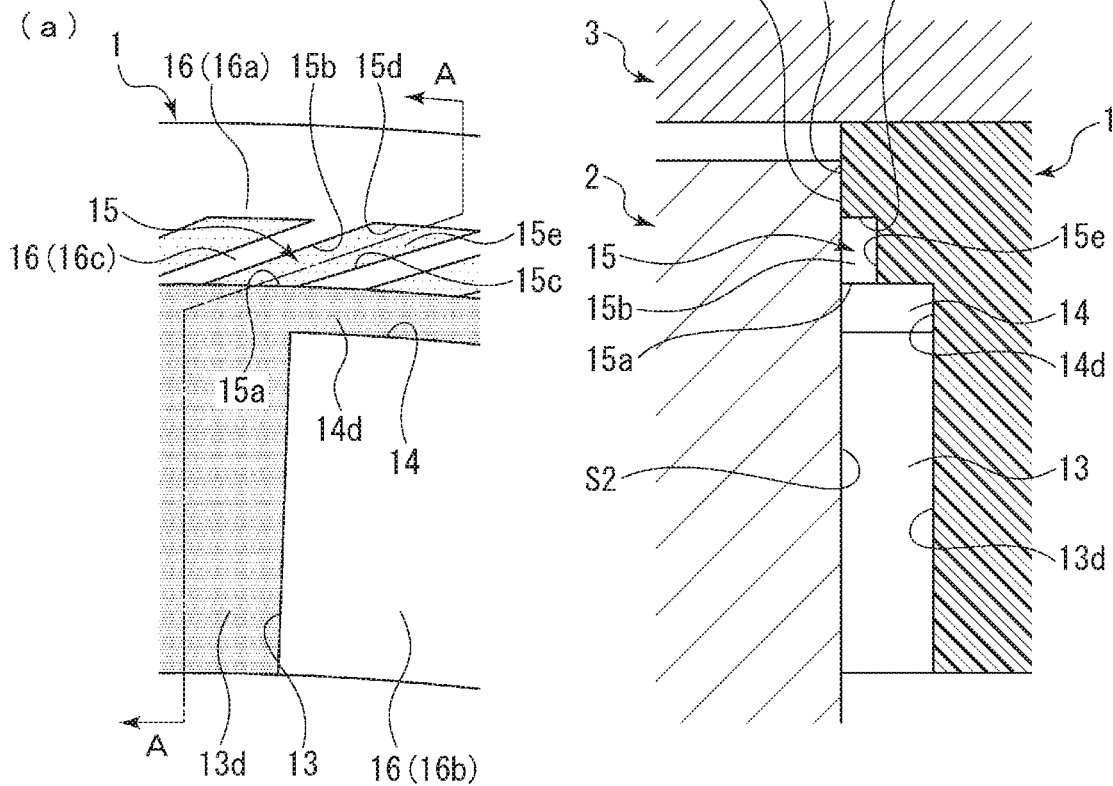
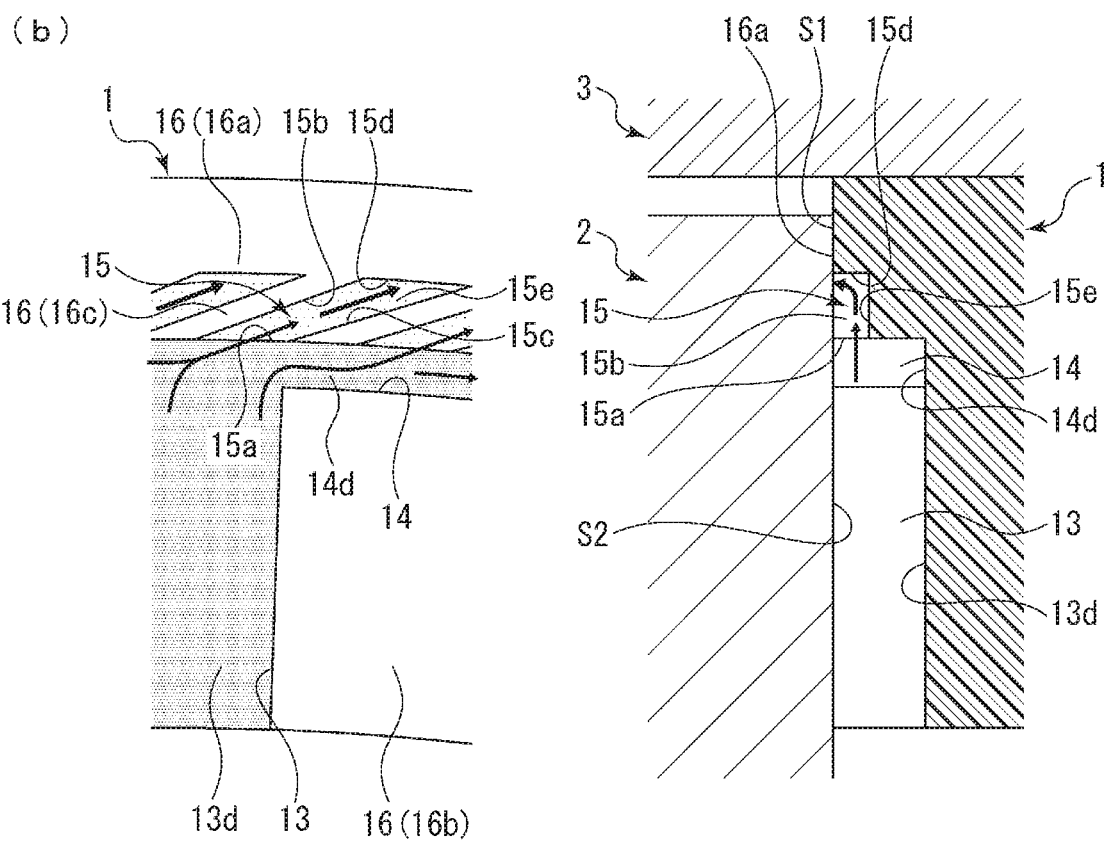

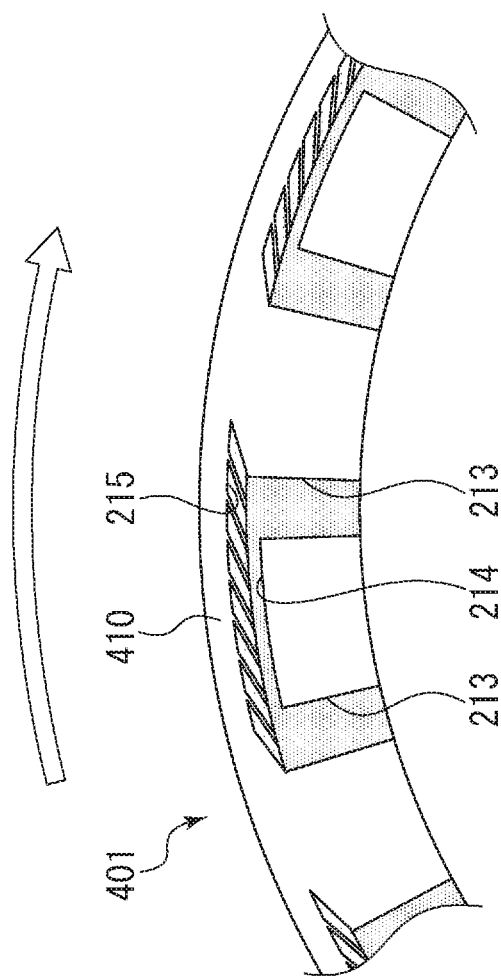

SEAL RING

TECHNICAL FIELD

The present invention relates to a seal ring used for sealing a clearance between a rotary shaft and a housing, and specifically relates to a seal ring used in a state in which the seal ring is attached to an annular groove, i.e., a so-called stuffing box.

BACKGROUND ART

Typically, a seal ring is attached to the outer periphery of a rotary shaft. A sliding surface of the seal ring slides in close contact with a sliding surface formed at the rotary shaft, and accordingly, the seal ring seals a clearance between the rotary shaft and a housing to prevent leakage of sealed fluid (e.g., liquid).

For maintaining sealing properties in the seal ring for a long period of time, conflicting conditions of "sealing" and "lubrication" need to be satisfied. Particularly in recent years, while prevention of leakage of the sealed fluid has been made for, e.g., environmental measures, a demand for friction reduction has increased for reducing a mechanical loss. Friction reduction can be accomplished by the technique of generating a dynamic pressure between the sliding surfaces by rotation of the rotary shaft to slide the sliding surfaces with a fluid film of the sealed fluid being interposed.

For example, a seal ring as described in Patent Citation 1 has been known as the seal ring configured to generate the dynamic pressure between the sliding surfaces by rotation of the rotary shaft. The seal ring of Patent Citation 1 is attached to an annular groove provided at the outer periphery of a rotary shaft. The seal ring is pressed to a housing side and one side wall surface side of the annular groove by the pressure of high-pressure sealed fluid, and a sliding surface at one side surface of the seal ring slides in close contact with a sliding surface at one side wall surface of the annular groove. Moreover, at the sliding surface at one side surface of the seal ring, multiple dynamic pressure grooves opening on an inner diameter side are provided in a circumferential direction. The dynamic pressure groove includes a deep groove at the center in the circumferential direction and shallow grooves formed continuously to both sides of the deep groove in the circumferential direction, extending in the circumferential direction, and having bottom surfaces inclined such that the shallow grooves gradually become shallower toward terminal ends. When the rotary shaft and the seal ring rotate relative to each other, the sealed fluid is introduced from the inner diameter side of the sliding surface into the deep grooves. Moreover, a negative pressure is generated in each shallow groove of the seal ring on a side opposite to a rotation direction of the rotary shaft. Meanwhile, the sealed fluid introduced into the deep grooves is supplied to each shallow groove on the same side as the rotation direction, and therefore, a positive pressure is generated in such a shallow groove. Then, the positive pressure increases due to wedge action caused by the inclined bottom surface of the rotation-direction-side shallow groove, and is generated across the entirety of the dynamic pressure groove. Accordingly, the force of slightly separating the sliding surfaces from each other, i.e., so-called buoyancy, is obtained. The sliding surfaces are slightly separated from each other, and therefore, the high-pressure sealed fluid flows into a portion between the sliding surfaces from the inner diameter side of the sliding surface and the sealed fluid flows out of the rotation-direction-side shallow grooves generating the positive pressure to the portion between the sliding surfaces. Thus, a fluid film is formed between the sliding surfaces, and lubricity between the sliding surfaces is maintained.

CITATION LIST

Patent Literature

Patent Citation 1: JP 9-210211 A (third page, FIG. 3)

SUMMARY OF INVENTION

Technical Problem

In the seal ring of Patent Citation 1, the sliding surface of the rotary shaft moves relative to the dynamic pressure grooves in the circumferential direction. The positive pressure increases as the number of rotations of the rotary shaft increases, and the fluid film is formed between the sliding surfaces to enhance the lubricity of the sliding surface. However, the dynamic pressure groove is configured such that both shallow grooves are positioned on the same circumference with respect to the deep groove. Thus, particularly upon high-speed rotation, cavitation is caused in a region where a great positive pressure and a great negative pressure are generated in the circumferential direction. Due to greater variation in the buoyancy generated across the circumferential direction of the sliding surface, there is a probability that an adverse effect on the fluid film, such as a non-uniform fluid film, is caused and the lubricity becomes unstable.

The present invention has been made in view of such a problem, and an object of the present invention is to provide a seal ring configured so that stable lubrication performance can be provided across a wide range of rotation speed.

Solution to Problem

For solving the above-described problem, a seal ring according to the present invention is a seal ring for sealing a clearance between a rotary shaft and a housing, including: inclined grooves formed at a sliding surface so as to be arranged in a circumferential direction, the inclined grooves being closed on an outer diameter side thereof and configured to generate a dynamic pressure; and supply grooves opening on a sealed fluid side and communicating with an inner diameter side of the inclined grooves. According to the aforesaid feature, high-pressure sealed fluid introduced through openings of the supply grooves is drawn from the inner diameter side of the inclined grooves, and generates a positive pressure on the outer diameter side of the inclined grooves. Thus, a fluid film can be formed with favorable balance in the circumferential direction on the outer diameter side of the inclined grooves, and therefore, stable lubrication performance can be provided across a wide range of rotation speed.

It may be preferable that the supply grooves are equally arranged in the circumferential direction. According to this preferable configuration, the high-pressure sealed fluid introduced through the openings of the supply grooves is supplied to the inclined grooves with favorable balance in the circumferential direction, and therefore, the fluid film can be formed with favorable balance in the circumferential direction on the outer diameter side of the inclined grooves.

It may be preferable that one of the supply grooves communicates with at least two the inclined grooves.

According to this preferable configuration, the high-pressure sealed fluid introduced through the openings of the supply grooves is supplied to the inclined grooves with more favorable balance in the circumferential direction, and therefore, the fluid film can be formed with favorable balance in the circumferential direction on the outer diameter side of the inclined grooves.

It may be preferable that the seal ring further comprises a communication groove through which the inclined grooves communicate with each other and which extends in the circumferential direction, the communication groove communicating with the supply grooves. According to this preferable configuration, the high-pressure sealed fluid introduced into the supply grooves is supplied in the circumferential direction of the sliding surface by the communication groove, and therefore, the sealed fluid is supplied from the communication groove to the inclined grooves with favorable balance in the circumferential direction.

It may be preferable that all of the inclined grooves communicate with each other through the communication groove extending in the circumferential direction. According to this preferable configuration, the high-pressure sealed fluid introduced into the supply grooves is supplied in the circumferential direction of the sliding surface by the communication groove, and therefore, the sealed fluid is reliably supplied to all of the inclined grooves with favorable balance in the circumferential direction.

It may be preferable that each of the inclined grooves is provided with an introduction port opening on the inner diameter side thereof, the introduction port being arranged on an outer diameter side of the sliding surface. According to this preferable configuration, the positive pressure can be generated on the outer diameter side with respect to the introduction port of the inclined groove, and therefore, the fluid film is formed with favorable balance in the circumferential direction on the outermost diameter side of the sliding surface.

BRIEF DESCRIPTION OF DRAWINGS

FIGS. 4A and 4B are partial side views and A-A sectional views of the seal ring according to the first embodiment for schematically illustrating a fluid film formation process in accordance with stages.

FIG. 10 is a partial side view of a seal ring according to a fifth embodiment of the present invention.

DESCRIPTION OF EMBODIMENTS

Hereinafter, modes for carrying out a seal ring according to the present invention will be described based on embodiments.

First Embodiment

A seal ring according to a first embodiment of the present invention will be described with reference to FIGS. 1 to 5. Hereinafter, the right side in the plane of paper of FIG. 2 will be described as a sealed fluid side L, and the left side in the plane of paper will be described as an atmosphere side A. Note that the fluid pressure of sealed fluid on the sealed fluid side L will be described as a higher pressure than an atmospheric pressure. Moreover, a sliding surface includes a flat surface and a groove recessed as compared to the flat surface. For the sake of convenience in description, the flat surface forming the sliding surface is, in the side views, indicated by the color of white, and the groove forming the sliding surface is indicated by dots.

The seal ring 1 according to the present embodiment seals a portion between a rotary shaft 2 and a housing 3 of a rotary machine, the rotary shaft 2 and the housing 3 rotating relative to each other. In this manner, the seal ring 1 partitions the inside of the housing 3 into the sealed fluid side L and the atmosphere side A (see FIG. 2), and prevents leakage of the sealed fluid from the sealed fluid side L to the atmosphere side A. Note that the rotary shaft 2 and the housing 3 are made of a metal material such as stainless steel. Moreover, the sealed fluid is one used for the purpose of cooling and lubricating, e.g., a not-shown gear and a not-shown bearing provided in a machine chamber of the rotary machine, such as oil.

Figure 1:
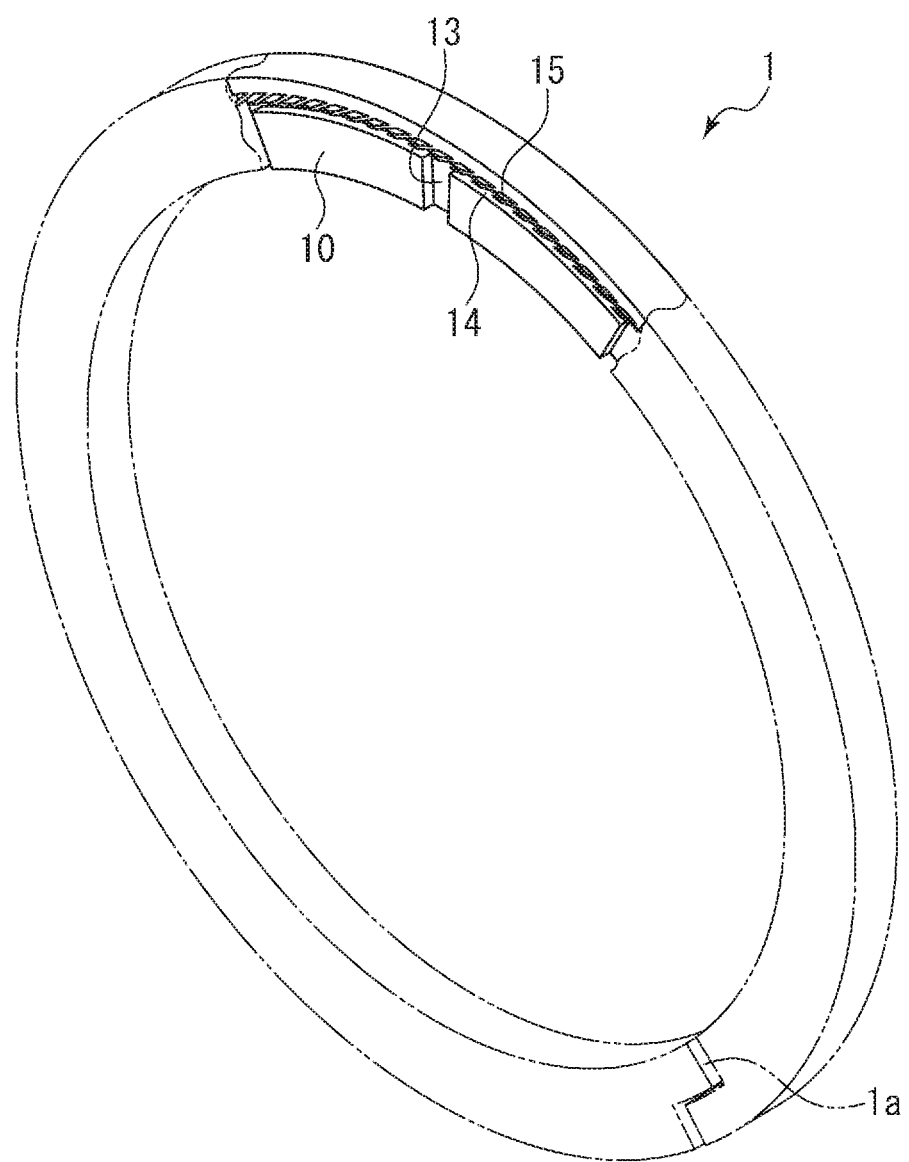
FIG. 1 is a perspective view illustrating a seal ring according to a first embodiment of the present invention by partially-simplified illustration.
Figure 2:
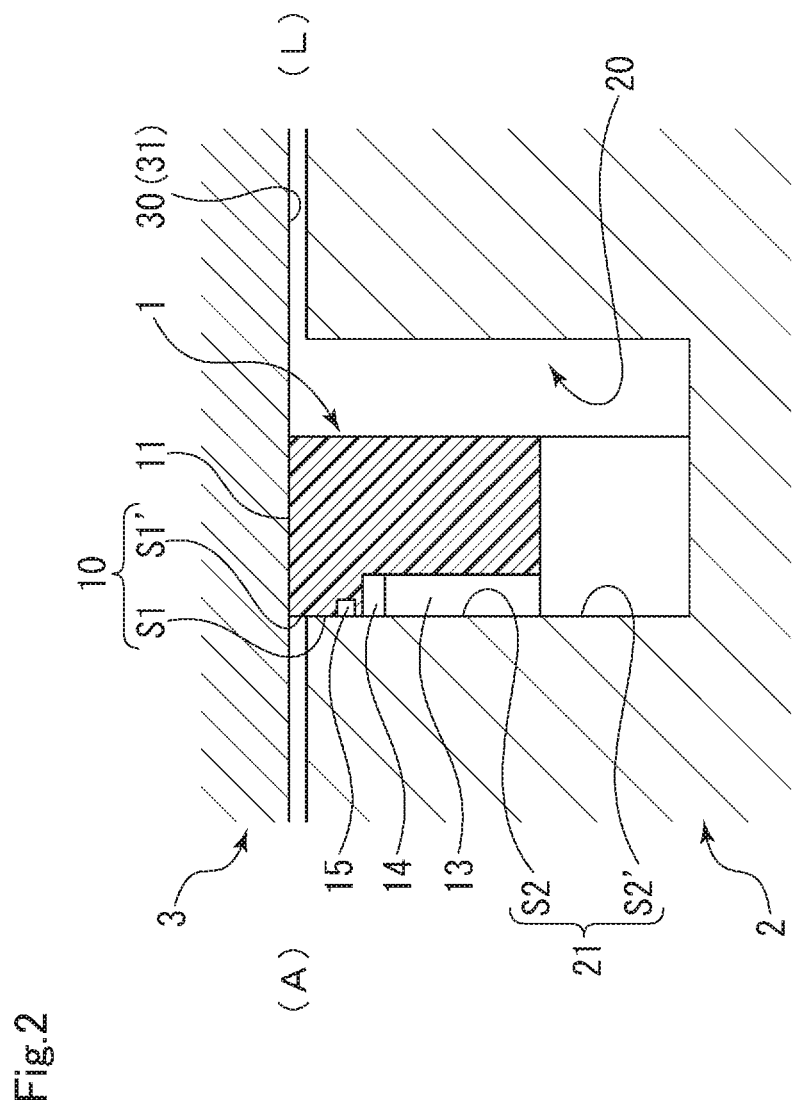
FIG. 2 is a sectional view illustrating a sealing structure for a clearance between a rotary shaft and a housing by the seal ring according to the first embodiment.
Figure 3:
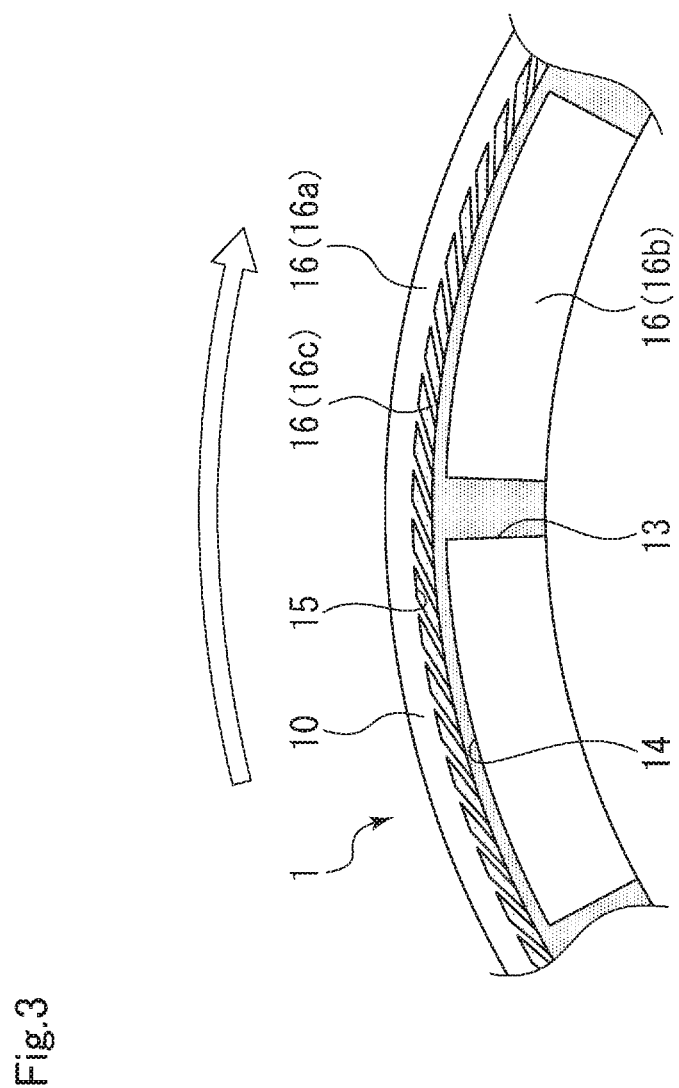
FIG. 3 is a partial side view of the seal ring according to the first embodiment.

As illustrated in FIGS. 1 to 3, the seal ring 1 is a component molded with resin such as PTFE, and is provided with a joint portion 1a at one spot in a circumferential direction to form a C-shape. The seal ring 1 is used with the seal ring 1 being attached to an annular groove 20, the annular groove 20 being provided along the outer periphery of the rotary shaft 2 and having a rectangular sectional shape. The rotary shaft 2 rotates clockwise as indicated by a white arrow in FIG. 3, and the seal ring 1 rotates counterclockwise relative to the annular groove 20 of the rotary shaft 2. Note that in FIG. 2, the section of the seal ring 1 along a radial direction is schematically illustrated.

Moreover, the seal ring 1 has a rectangular sectional shape. The seal ring 1 is pressed to the atmosphere side A by the fluid pressure of the sealed fluid acting on a side surface on the sealed fluid side L, and accordingly, a sliding surface S1 formed on a side surface 10 (hereinafter sometimes merely referred to as a "side surface 10") side on the atmosphere side A slidably closely contacts a sliding surface S2 on a side wall surface 21 (hereinafter sometimes merely referred to as a "side wall surface 21") side of the annular groove 20 on the atmosphere side A. Further, in response to stress in an expansion direction due to the fluid pressure of the sealed fluid acting on an inner circumferential surface, the seal ring 1 is pressed in an outer diameter direction, and accordingly, an outer circumferential surface 11 closely contacts an inner circumferential surface 31 of a shaft hole 30 of the housing 3.

Note that the sliding surfaces S1, S2 form a substantial sliding region between the side surface 10 of the seal ring 1 and the side wall surface 21 of the annular groove 20 of the rotary shaft 2. Moreover, a non-sliding surface S1' is formed continuously to an outer diameter side of the sliding surface S1 on the side surface 10 side, and a non-sliding surface S2' is formed continuously to an inner diameter side of the sliding surface S2 on the side wall surface 21 side (see FIG. 2).

As illustrated in FIGS. 1 to 4, the sliding surface S1 formed on the side surface 10 side of the seal ring 1 includes a flat surface 16, multiple supply grooves 13 extending in the radial direction from an inner-diameter-side end portion of the side surface 10, a communication groove 14 communicating with outer-diameter-side end portions of the supply grooves 13 and formed continuously in a substantially annular shape across the joint portion 1a, and multiple inclined grooves 15 communicating with an outer-diameter-side end portion of the communication groove 14 and formed inclined to the outer diameter side in the direction of rotation of the rotary shaft 2. Note that the supply grooves 13 and the inclined grooves 15 are arranged at equal intervals in the circumferential direction of the sliding surface S1, except for the vicinity of the joint portion 1a.

The flat surface 16 includes a seal portion 16a positioned on the outer diameter side of the multiple inclined grooves 15 and formed continuously in a substantially annular shape across the joint portion 1a, an inner-diameter-side lubrication portion 16b sandwiched by adjacent ones of the supply grooves 13 in the circumferential direction, and an outer-diameter-side lubrication portion 16c sandwiched by adjacent ones of the inclined grooves 15 in the circumferential direction (see FIG. 3).

As illustrated in FIGS. 2 to 5, the supply groove 13 supplies, regardless of rotation/stop of the rotary shaft 2, the sealed fluid to a portion between the sliding surfaces S1, S2 when the sealed fluid has a higher pressure than that of atmospheric air. The supply groove 13 has a rectangular shape as viewed from the side. The supply groove 13 opens on the inner diameter side (i.e., the sealed fluid side) of the sliding surface S1, and communicates with the communication groove 14 on the outer diameter side. Moreover, a bottom surface 13d (see FIG. 4A) of the supply groove 13 is formed flat, and is parallel with the flat surface 16. The depth of the supply groove 13 is several tens to several hundreds of µm and preferably 100 to 200 µm. Note that the depth of the supply groove 13 may be deeper (e.g., up to about a depth of 1 mm).

The communication groove 14 is formed to extend in the circumferential direction at a position on the outer diameter side with respect to the center of the sliding surface S1 in the radial direction, has an arc shape as viewed from the side, and has a shorter dimension in the radial direction than the dimension of the supply groove 13 in the circumferential direction. Moreover, a bottom surface 14d of the communication groove 14 is formed flat, is parallel with the flat surface 16, and is formed continuously to the bottom surface 13d of the supply groove 13. The depth of the communication groove 14 is substantially the same as that of the supply groove 13 (see FIG. 4A).

As illustrated in FIGS. 2 to 5, the inclined groove 15 extends to the outer diameter side in the rotation direction of the rotary shaft 2 from the communication groove 14, i.e., extends inclined with respect to the radial direction, and has the function of generating a dynamic pressure according to rotation of the rotary shaft 2. The inclined groove 15 is configured such that an introduction port 15a communicating with the outer-diameter-side end portion of the communication groove 14, a planar outer inclined wall portion 15b positioned on an opposite rotation side of the rotary shaft 2 and formed perpendicularly to a bottom surface 15e, a planar inner inclined wall portion 15c positioned on a rotation side of the rotary shaft 2 and formed perpendicularly to the bottom surface 15e, and a closed portion 15d crossing the outer inclined wall portion 15b and the inner inclined wall portion 15c on the outer diameter side and formed substantially parallel with the introduction port 15a formed perpendicularly to the bottom surface 15e form a parallelogram shape as viewed from the side. The inclined groove 15 has the substantially same dimension in the circumferential direction as the dimension of the communication groove 14 in the radial direction, and has a longer dimension in an extension direction than the dimension in the circumferential direction. Moreover, the inclined groove 15 is arranged on the outer diameter side with respect to the center of the sliding surface S1 in the radial direction. Further, the bottom surface 15e of the inclined groove 15 is formed flat, and is parallel with the flat surface 16. The depth of the inclined groove 15 is shallower than those of the supply groove 13 and the communication groove 14.

In addition, the outer-diameter-side lubrication portion 16c having a shorter dimension in the circumferential direction than the dimension of the inclined groove 15 in the circumferential direction is interposed between adjacent ones of the inclined grooves 15 in the circumferential direction. Note that the dimensions of these portions may be the same as each other, or the outer-diameter-side lubrication portion 16c may have a longer dimension. Moreover, the multiple inclined grooves 15 may be formed with a curvature such that the outer-diameter-side lubrication portions 16c are formed to the outer diameter side with the substantially equal width.

Figure 5:
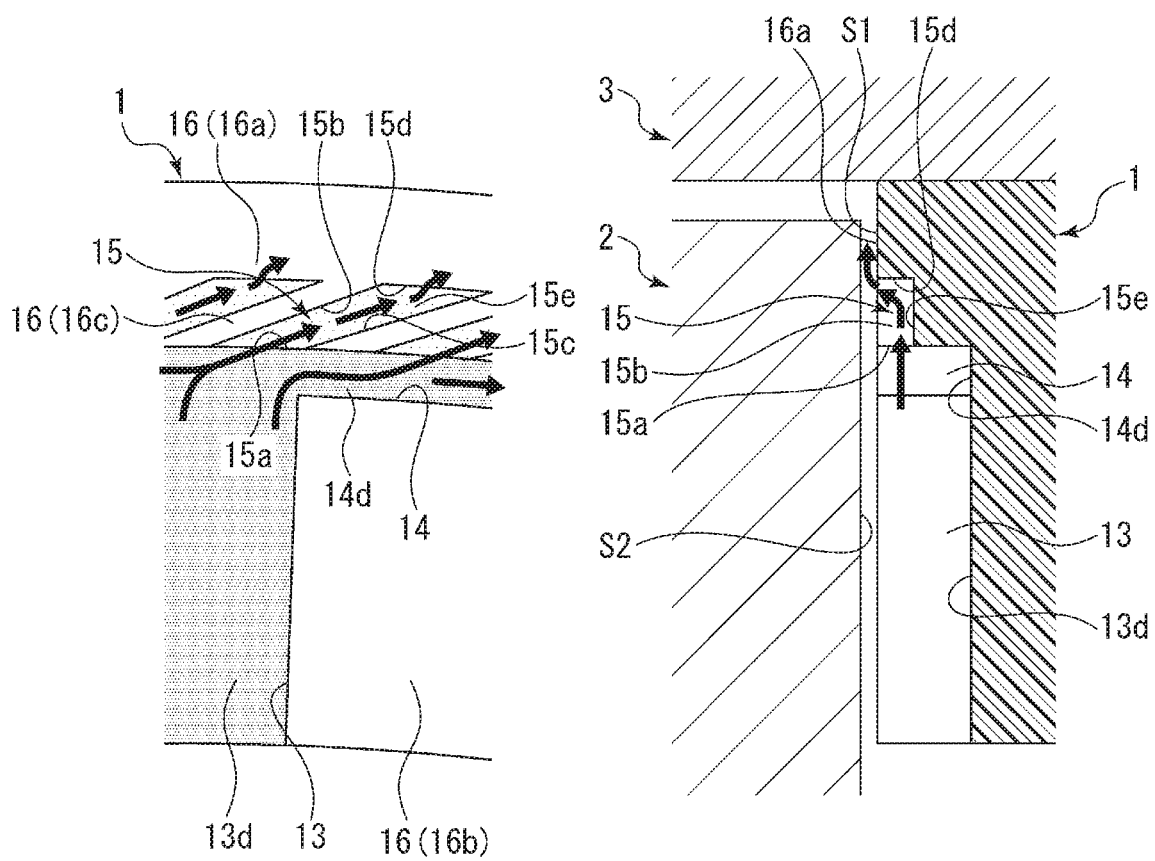
FIG. 5 is a partial side view and an A-A sectional view of the seal ring according to the first embodiment for schematically illustrating, following FIGS. 4A and 4B, the fluid film formation process in accordance with the stages.

Next, fluid film formation between the sliding surface S1 of the seal ring 1 and the sliding surface S2 of the side wall surface 21 of the annular groove 20 (hereinafter sometimes merely referred to as "between the sliding surfaces S1, S2") will be described with reference to FIGS. 4A, 4B, and 5. Note that a case where the rotary shaft 2 rotates clockwise as indicated by the white arrow in FIG. 3, i.e., a case where the seal ring 1 rotates counterclockwise relative to the annular groove 20 of the rotary shaft 2 in FIG. 3, will be described herein by way of example. Further, note that each of FIGS. 4A, 4B, and 5 schematically illustrates an association between an enlarged partial side view of the seal ring 1 as viewed from the side and an A-A sectional view cut along the supply groove 13, the communication groove 14, and the inclined groove 15 of the enlarged partial side view.

First, as illustrated in FIG. 4A, when the rotary shaft 2 stands still, the supply grooves 13, the communication groove 14, and the inclined grooves 15 are filled with the sealed fluid due to the fluid pressure. Moreover, the high-pressure sealed fluid is supplied to the supply grooves 13 and the communication groove 14, and due to a resting pressure, the force of separating the sliding surfaces S1, S2 acts on the supply grooves 13 and the communication groove 14.

Next, as illustrated in FIG. 4B, upon rotation of the rotary shaft 2, the sliding surface S1 on the side surface 10 side slides on the sliding surface S2 on the side wall surface 21 (see FIG. 2) side. Accordingly, the sealed fluid flows into the inclined grooves 15 through the introduction ports 15a of the inclined grooves 15. The sealed fluid comes into contact with the inner inclined wall portions 15c of the inclined grooves 15, and therefore, is guided to the outer diameter side of the inclined grooves 15 while moving toward the closed portions 15d. A positive pressure on a closed portion 15d side is increased due to wedge action generated by such a sealed fluid flow, and is increased to equal to or higher than a predetermined pressure. Thus, as illustrated in FIG. 5, the force of slightly separating the sliding surfaces S1, S2 from each other, i.e., buoyancy, can be generated. Moreover, the sliding surface S2 passes over the supply grooves 13, and therefore, the sealed fluid flows out of the supply grooves 13 to follow the rotation direction of the rotary shaft 2.

When the sliding surfaces S1, S2 are slightly separated from each other by the above-described buoyancy and the above-described resting pressure, a fluid film of the sealed fluid is formed between the sliding surfaces S1, S2. Moreover, the pressure-increased sealed fluid is supplied from the closed portions 15d of the inclined grooves 15 to the vicinity of the seal portion 16a, and therefore, the fluid film is reliably formed on the seal portion 16a and lubricity is enhanced. Meanwhile, the communication groove 14 communicates with an introduction port 15a side, and therefore, the sealed fluid is continuously supplied to the inclined grooves 15 without depletion of the sealed fluid. Note that the sealed fluid is continuously supplied to the communication groove 14 through the supply grooves 13 without depletion of the sealed fluid.

Moreover, the multiple inclined grooves 15 are formed at equal intervals across the circumferential direction, and therefore, the dynamic pressure is substantially uniformly generated across the outer diameter side (a closed portion 15d side of each inclined groove 15 and the seal portion 16a) of the sliding surface S1. Thus, stable buoyancy can be obtained across the circumferential direction.

Further, as described above, not only the sealed fluid is mainly supplied from the inclined grooves 15 to a portion between the sliding surface S2 and the seal portion 16a, but also the high-pressure sealed fluid is supplied from the inclined grooves 15 and the communication groove 14 to the outer-diameter-side lubrication portion 16c interposed between adjacent ones of the inclined grooves 15 in the circumferential direction and is supplied from the inner diameter side of the sliding surface S1 and the supply grooves 13 to the inner-diameter-side lubrication portion 16b defined by adjacent ones of the supply grooves 13 and the communication groove 14. Thus, the fluid film of the sealed fluid having a substantially equal thickness is formed between the sliding surfaces S1, S2.

As described above, the high-pressure sealed fluid introduced through inner-diameter-side openings of the supply grooves 13 is drawn from the inner diameter side of the inclined grooves 15, and generates the positive pressure on the outer diameter side of the inclined grooves 15. Thus, the fluid film can be formed with favorable balance in the circumferential direction on the outer diameter side of the inclined grooves 15, and therefore, stable lubrication performance can be provided across a wide range of rotation speed.

Moreover, the sealed fluid is sufficiently supplied as described above, and therefore, the fluid film can be reliably formed between the sliding surfaces S1, S2 across a wide range of rotation speed. Thus, the lubricity of the seal ring 1 can be enhanced.

Further, the supply grooves 13 are equally arranged in the circumferential direction, and therefore, the high-pressure sealed fluid introduced through the openings of the supply grooves 13 is supplied to the communication groove 14 and the inclined grooves 15 with favorable balance in the circumferential direction. Thus, the fluid film is formed with favorable balance in the circumferential direction on the outer diameter side of the inclined grooves 15.

In addition, one supply groove 13 communicates with the multiple inclined grooves 15, and therefore, the high-pressure sealed fluid introduced through the openings of the supply grooves 13 is supplied to the inclined grooves 15 with more favorable balance in the circumferential direction. Thus, the fluid film is formed with favorable balance in the circumferential direction on the outer diameter side of the inclined grooves 15.

Moreover, the multiple inclined grooves 15 communicate with each other through the communication groove 14 extending in the circumferential direction, and the communication groove 14 communicates with the supply grooves 13. Thus, the high-pressure sealed fluid introduced into the supply grooves 13 is supplied in the circumferential direction of the sliding surfaces S1, S2 by the communication groove 14, and therefore, the sealed fluid is supplied from the communication groove 14 to the inclined grooves 15 with favorable balance in the circumferential direction.

Further, all of the multiple inclined grooves 15 communicate with each other through the communication groove 14 extending in the circumferential direction, and therefore, the high-pressure sealed fluid introduced into the supply grooves 13 is supplied in the circumferential direction of the sliding surfaces S1, S2 by the communication groove 14. Thus, the sealed fluid is reliably supplied to all of the inclined grooves 15 with favorable balance in the circumferential direction.

In addition, the introduction ports 15a formed on the inner diameter side of the inclined grooves 15 are provided on the outer diameter side of the sliding surfaces S1, S2, and therefore, the positive pressure can be generated on the outer diameter side with respect to the introduction ports 15a of the inclined grooves 15. Thus, the fluid film can be formed with favorable balance in the circumferential direction on the outermost diameter side of the sliding surfaces S1, S2.

Moreover, the seal ring 1 is in the C-shape, and therefore, seal performance can be stably maintained even when the circumferential length of the seal ring 1 changes due to thermal expansion/contraction.

Second Embodiment

Figure 6:
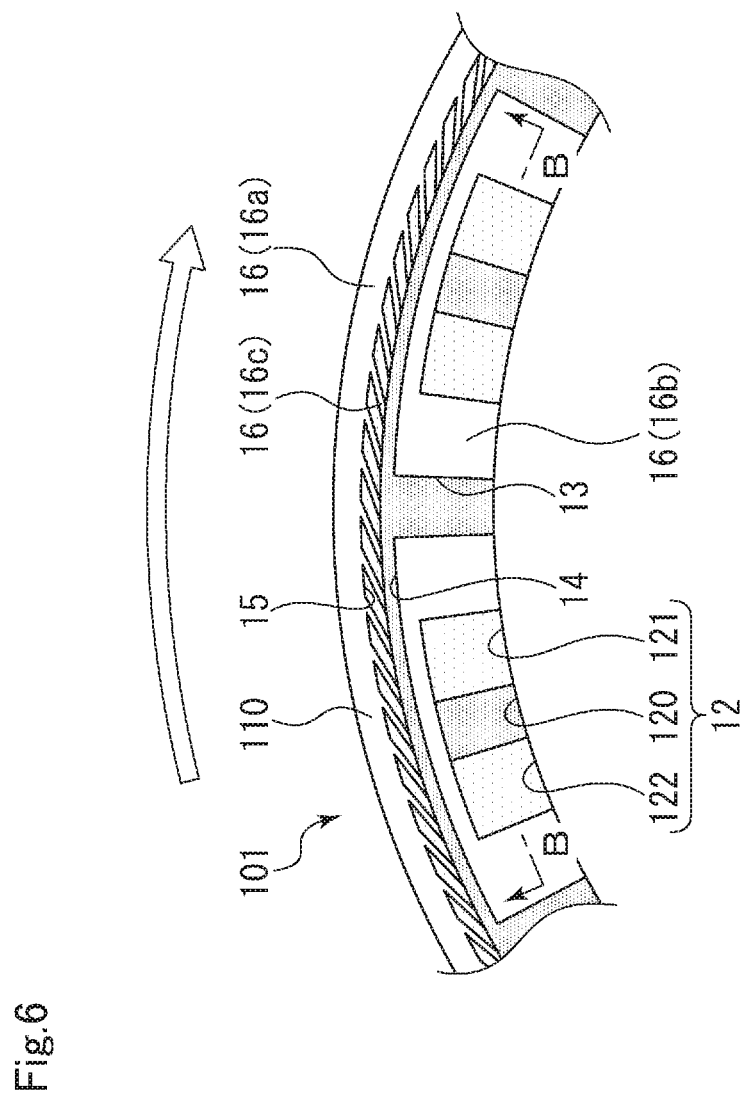
FIG. 6 is a partial side view of a seal ring according to a second embodiment of the present invention.

Next, a seal ring according to a second embodiment of the present invention will be described with reference to FIGS. 6 and 7. Note that the same reference numerals are used to represent the same components as those described in the above-described embodiment, and overlapping description thereof will be omitted.

The seal ring 101 in the second embodiment will be described. As illustrated in FIG. 6, in the present embodiment, a sliding surface S1 (see FIG. 2) formed at a side surface 110 of the seal ring 101 includes a flat surface 16, multiple supply grooves 13, a communication groove 14, multiple inclined grooves 15, and a dynamic pressure groove 12 provided between adjacent ones of the supply grooves 13 in a circumferential direction.

The dynamic pressure groove 12 has the function of generating a dynamic pressure according to rotation of a rotary shaft 2. The dynamic pressure groove 12 includes a deep groove 120 opening on an inner diameter side (i.e., the sealed fluid side) of the seal ring 101 and provided at the center in the circumferential direction and a pair of shallow grooves 121, 122 (also referred to as a positive pressure generator and a negative pressure generator) formed continuously from both sides of the deep groove 120 in the circumferential direction and extending in the circumferential direction. An inner-diameter-side lubrication portion 16b in an inverted U-shape as viewed from the side is arranged between the dynamic pressure groove 12 and each of the supply grooves 13 adjacent to such a dynamic pressure groove 12 in the circumferential direction and the communication groove 14. Note that in FIGS. 6 and 7, the right side with respect to the deep groove 120 in the plane of paper is the shallow groove 121 (i.e., the positive pressure generator), and the left side in the plane of paper is the shallow groove 122 (the negative pressure generator).

Figure 7:
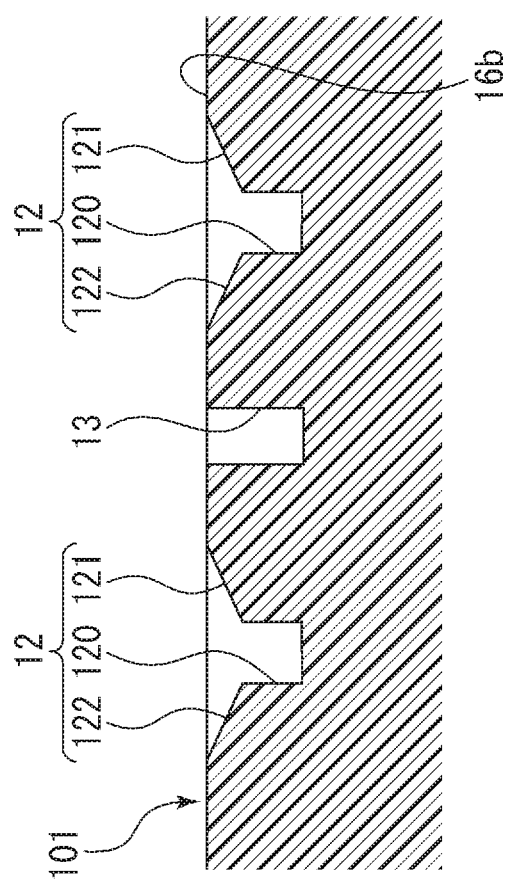
FIG. 7 is a B-B sectional view of the seal ring shown in FIG. 6.

Specifically, as illustrated in FIG. 7, the deep groove 120 has a bottom surface formed flat, and the shallow grooves 121, 122 have bottom surfaces as inclined surfaces formed such that the shallow grooves 121, 122 gradually become shallower from a deep groove 120 side to terminal ends in the circumferential direction. Moreover, the bottom surface of the deep groove 120 is formed much deeper than deepest portions of the shallow grooves 121, 122, and the depth of the deep groove 120 is several tens to several hundreds of μm and preferably 100 to 200 μm.

According to such a configuration, in fluid film formation between the sliding surfaces S1, S2, a negative pressure is generated in each shallow groove 122 (hereinafter merely referred to as a "shallow groove 122") of the seal ring 101 on a side (the left side in the plane of paper of FIG. 6) opposite to a rotation direction of the rotary shaft 2. Meanwhile, sealed fluid introduced into the deep grooves 120 is supplied to each shallow groove 121 (hereinafter merely referred to as a "shallow groove 121") of the seal ring 101 on the same side (i.e., the right side in the plane of paper of FIG. 6) as the rotation direction, and a positive pressure is generated in such a shallow groove 121 due to wedge action caused by the inclined surface. Then, the positive pressure is generated across the entirety of the dynamic pressure grooves 12, and accordingly, the force of slightly separating the sliding surfaces S1, S2 from each other, i.e., so-called buoyancy, is obtained. That is, the positive pressure (i.e., the buoyancy) can be generated not only on an outer diameter side of the sliding surfaces S1, S2 but also on an inner diameter side by the dynamic pressure grooves 12. Thus, responsiveness of fluid film formation to rotation of the rotary shaft 2 can be enhanced.

Moreover, the force of sucking the sealed fluid present between the sliding surfaces S1, S2 around the shallow groove 122 generating the negative pressure acts on such a shallow groove 122. Thus, the sealed fluid is supplied to the shallow groove 122 and a surrounding inner-diameter-side lubrication portion 16b thereof from the supply groove 13 adjacent to such a shallow groove 122 in the circumferential direction. Further, the shallow groove 122 as the negative pressure generator in the dynamic pressure groove 12 opens on the inner diameter side (i.e., the sealed fluid side), and the sealed fluid is also introduced from the inner diameter side of the sliding surface S1. Thus, the sealed fluid is easily held on the shallow groove 122.

Further, the dynamic pressure groove 12 arranged on the inner diameter side of the sliding surface S1 may be freely formed, and may be formed as, e.g., a T-shaped groove, a Rayleigh step, or a spiral groove.

Third Embodiment

Figure 8:
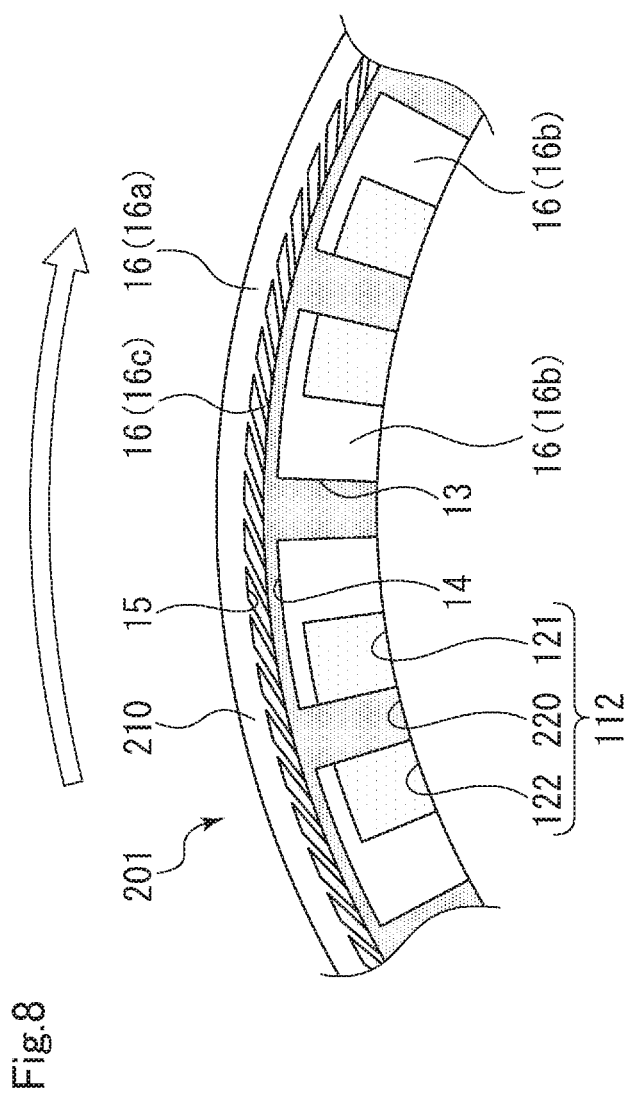
FIG. 8 is a partial side view of a seal ring according to a third embodiment of the present invention.

Next, a seal ring according to a third embodiment of the present invention will be described with reference to FIG. 8. Note that the same reference numerals are used to represent the same components as those described in the above-described embodiments, and overlapping description thereof will be omitted.

The seal ring 201 in the third embodiment will be described. As illustrated in FIG. 8, in the present embodiment, a sliding surface S1 (see FIG. 2) formed at a side surface 210 of the seal ring 201 includes a flat surface 16, multiple supply grooves 13, a communication groove 14, multiple inclined grooves 15, and a dynamic pressure groove 112 provided between adjacent ones of the supply grooves 13 in a circumferential direction.

The dynamic pressure groove 112 includes a deep groove 220 opening on an inner diameter side (i.e., the sealed fluid side) of the seal ring 201, provided at the center in the circumferential direction, and communicating with the communication groove at an outer-diameter-side end portion and a pair of shallow grooves 121, 122 formed continuously from both sides of the deep groove 220 in the circumferential direction and extending in the circumferential direction. An inner-diameter-side lubrication portion 16b in an L-shape as viewed from the side is arranged between the dynamic pressure groove 112 and each of the supply grooves 13 adjacent to such a dynamic pressure groove 112 and the communication groove 14.

According to such a configuration, in fluid film formation between the sliding surfaces S1, S2, sealed fluid can be supplied to the communication groove 14 not only from the supply grooves 13 but also from the deep grooves 220 of the dynamic pressure grooves 112. Thus, a fluid film can be more reliably formed between the sliding surfaces S1, S2 across a wide range of rotation speed, and lubricity of the seal ring 201 can be enhanced.

Fourth Embodiment

Figure 9:
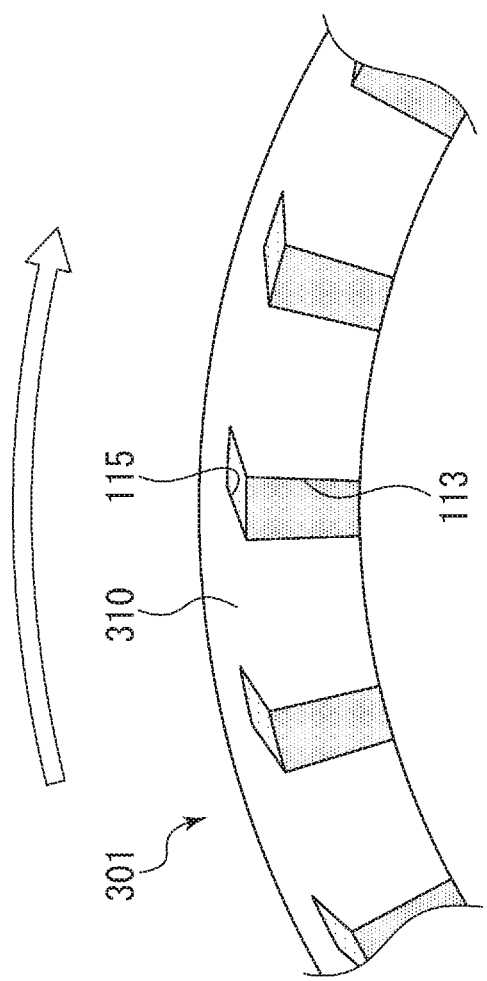
FIG. 9 is a partial side view of a seal ring according to a fourth embodiment of the present invention.

Next, a seal ring according to a fourth embodiment of the present invention will be described with reference to FIG. 9. Note that the same reference numerals are used to represent the same components as those described in the above-described embodiments, and overlapping description thereof will be omitted.

The seal ring 301 in the fourth embodiment will be described. As illustrated in FIG. 9, in the present embodiment, a sliding surface S1 (see FIG. 2) formed at a side surface 310 of the seal ring 301 includes a flat surface 16, multiple supply grooves 113, and a single inclined groove 115 communicating with each supply groove 113. According to such a configuration, stable buoyancy in a circumferential direction can be, with a simple configuration, obtained at outermost diameter portions of the sliding surfaces S1, S2.

Fifth Embodiment

Next, a seal ring according to a fifth embodiment of the present invention will be described with reference to FIG. 10. Note that the same reference numerals are used to represent the same components as those described in the above-described embodiments, and overlapping description thereof will be omitted.

The seal ring 401 in the fifth embodiment will be described. As illustrated in FIG. 10, in the present embodiment, a sliding surface S1 (see FIG. 2) formed at a side surface 410 of the seal ring 401 includes a flat surface 16, multiple supply grooves 213, multiple communication paths 214 each communicating with adjacent two of the supply grooves 213, and multiple inclined grooves 215 communicating with each communication path 214. According to such a configuration, stable buoyancy in a circumferential direction can be, with a simpler configuration than those of the first to third embodiments, obtained at outermost diameter portions of the sliding surfaces S1, S2.

The embodiments of the present invention have been described above with reference to the drawings, but specific configurations are not limited to these embodiments. The present invention also includes even changes and additions made without departing from the scope of the present invention.

For example, the configuration of the dynamic pressure groove of the second embodiment or the third embodiment may be applied to the fourth and fifth embodiments.

Moreover, the form in which the rotary shaft 2 is turned clockwise to generate the dynamic pressure in the inclined grooves 15 has been described. However, the rotary shaft 2 is rotated counterclockwise to move the sealed fluid from the closed portion 15d side to the introduction port 15a side of the inclined groove 15, and therefore, outflow of the sealed fluid can be reduced with favorable responsiveness.

Further, the number and shape of dynamic pressure grooves provided at the sliding surface S1 of the seal ring, the number and shape of supply grooves provided at the sliding surface S1 of the seal ring, the number and shape of communication paths provided at the sliding surface S1 of the seal ring, and the number and shape of inclined grooves provided at the sliding surface S1 of the seal ring may be changed as necessary such that a desired dynamic pressure effect is obtained. Note that the location and shape of the deep groove of the dynamic pressure groove to which the sealed fluid is introduced, the location and shape of the supply groove to which the sealed fluid is introduced, the location and shape of the communication path to which the sealed fluid is introduced, and the location and shape of the inclined groove to which the sealed fluid is introduced may be changed as necessary according to the assumed degree of abrasion of the sliding surface.

In addition, the inclined groove may have a bottom surface as an inclined surface formed such that the inclined groove gradually becomes shallower from the introduction port side to the closed portion. With such a form, the positive pressure is more easily generated due to taper action.

Moreover, the seal ring may be formed in an annular shape without the joint portion 1a, and the outer shape thereof is not limited to a circular shape as viewed from the side. The seal ring may be formed in a polygonal shape.

Further, the seal ring is not limited to the rectangular sectional shape, and for example, may have a trapezoidal sectional shape or a polygonal sectional shape. The seal ring may be configured such that the side surface forming the sliding surface S1 is inclined.

In addition, the grooves described in the above-described embodiments may be formed at the sliding surface S2 of the annular groove 20 of the rotary shaft 2.

Moreover, the oil has been described as the example of the sealed fluid, but the sealed fluid may be liquid such as water or coolant or gas such as air or nitrogen.

REFERENCE SIGNS LIST 1 to 401 Seal ring
2 Rotary shaft
3 Housing
10 Side surface
12 Dynamic pressure groove
13 Supply groove
14 Communication groove
15 Inclined groove
15a Introduction port
16 Flat surface
16a Seal portion
16b Inner-diameter-side lubrication portion
16c Outer-diameter-side lubrication portion
20 Annular groove
21 Side wall surface
110 Side surface
112 Dynamic pressure groove
113 Supply groove
214 Communication path
115 Inclined groove
210 Side surface
213 Supply groove
215 Inclined groove
310 Side surface
410 Side surface
S1, S2 Sliding surface
S1', S2' Non-sliding surface

The invention claimed is:

1. A seal ring for sealing a clearance between a rotary shaft and a housing, comprising:
   inclined grooves formed at a sliding surface so as to be arranged in a circumferential direction, the inclined grooves being closed on an outer diameter side thereof and configured to generate a dynamic pressure; and
   supply grooves opening on a sealed fluid side and communicating with an inner diameter side of the inclined grooves, wherein
   the seal ring further comprises a communication groove through which the inclined grooves communicate with each other and which extends in the circumferential direction, and
   the communication groove communicates with the supply grooves.

2. The seal ring according to claim 1, wherein
   the supply grooves are equally arranged in the circumferential direction.

3. The seal ring according to claim 2, wherein
   one of the supply grooves communicates with at least two the inclined grooves.

4. The seal ring according to claim 2, further comprising a communication groove through which the inclined grooves communicate with each other and which extends in the circumferential direction, wherein
   the communication groove communicates with the supply grooves.

5. The seal ring according to claim 4, wherein
   all of the inclined grooves communicate with each other through the communication groove extending in the circumferential direction.

6. The seal ring according to claim 2, wherein
   each of the inclined grooves is provided with an introduction port opening on the inner diameter side thereof, the introduction port being arranged on an outer diameter side of the sliding surface.

7. The seal ring according to claim 1, wherein
   one of the supply grooves communicates with at least two the inclined grooves.

8. The seal ring according to claim 7, further comprising a communication groove through which the inclined grooves communicate with each other and which extends in the circumferential direction, wherein
   the communication groove communicates with the supply grooves.

9. The seal ring according to claim 8, wherein
all of the inclined grooves communicate with each other through the communication groove extending in the circumferential direction.

10. The seal ring according to claim 7, wherein
each of the inclined grooves is provided with an introduction port opening on the inner diameter side thereof, the introduction port being arranged on an outer diameter side of the sliding surface.

11. The seal ring according to claim 1, wherein
all of the inclined grooves communicate with each other through the communication groove extending in the circumferential direction.

12. The seal ring according to claim 11, wherein
each of the inclined grooves is provided with an introduction port opening on the inner diameter side thereof, the introduction port being arranged on an outer diameter side of the sliding surface.

13. The seal ring according to claim 1, wherein
each of the inclined grooves is provided with an introduction port opening on the inner diameter side thereof, the introduction port being arranged on an outer diameter side of the sliding surface.

\* \* \* \* \*